United States Patent [19]
Hashimoto et al.

[11] Patent Number: 6,128,670
[45] Date of Patent: Oct. 3, 2000

[54] IMAGE INPUT DEVICE EMPLOYING A PERSONAL COMPUTERCARD/INTERFACE OR GENERIC INTERFACE

[75] Inventors: Toshikazu Hashimoto; Kenichi Tsujimura, both of Tokyo, Japan

[73] Assignee: NEC Corporation, Tokyo, Japan

[21] Appl. No.: 08/975,004

[22] Filed: Nov. 20, 1997

[30] Foreign Application Priority Data

Nov. 22, 1996 [JP] Japan ..................................... 8-312161
Feb. 12, 1997 [JP] Japan ..................................... 9-027895

[51] Int. Cl.[7] ...................................................... G06F 9/00
[52] U.S. Cl. .................................... 710/1; 710/8; 710/62; 710/129; 710/131; 395/500
[58] Field of Search ................................. 710/1, 5, 8, 13, 710/14, 15, 16, 62, 63, 129, 130, 131; 395/500

[56] References Cited

U.S. PATENT DOCUMENTS 5,752,075  5/1998  Kikinis .......................................... 710/1
5,819,103  10/1998  Endoh et al. ................................ 710/1
5,887,147  3/1999  Arai et al. ................................. 710/106
5,901,329  5/1999  Kito ............................................ 710/8

FOREIGN PATENT DOCUMENTS 4-109368  4/1992  Japan .
8-18711  1/1996  Japan .

Primary Examiner—Xuan M. Thai
Attorney, Agent, or Firm—Sughrue, Mion, Zinn, Macpeak & Seas, PLLC

[57] ABSTRACT

An image input device is disclosed that employs a generic interface. Upon connection of the image input device to a host device, an interface control circuit causes the host device to recognize the image input device as a removable device. The interface control circuit then executes a response to the host device indicating that a disk medium is not inserted while an image reading construct is reading an image, converts the digital data to image data of a file format such as MS-DOS that can be read by the host device and stores the data to RAM. The interface control circuit then executes a response to the host device indicating that a disk medium is an inserted state when the image reading construct completes reading of the image.

3 Claims, 3 Drawing Sheets

IMAGE INPUT DEVICE EMPLOYING A PERSONAL COMPUTERCARD/INTERFACE OR GENERIC INTERFACE

BACKGROUND OF THE INVENTION

1. Field of the Invention

The present invention relates to an image input device used for reading images of a three-dimensional or planar object as digital data by a computer, and particularly relates to the interface control of such a device.

2. Description of the Related Art

For the purpose of transferring digitized image data, image input devices of this type in the prior art have used printer ports, serial ports, SCSI (Small Computer System Interface) ports, I/O (Input/output) ports employing dedicated interface boards, and I/O ports employing PC (Personal Computer) card interfaces.

In the above-described prior-art image input devices, the host device side has required a board dedicated to image input when transferring the read image data to the host device to which the image input device is connected. The image input device then transferred the image data to the host device using the dedicated interface, or transferred the data to the host device using a standard interface such as a SCSI. In such cases, the image input device required a control program corresponding to each of the various interfaces to respond to the operating system (hereinbelow abbreviated "OS") of the host computer as an image input device.

An image input device using a SCSI interface described hereinabove having the object of increasing generality is disclosed in Japanese Patent Laid-open No. 109368/92. In this image input device, however, a control program for exchanging information with the host device must be produced for each host device.

Japanese Patent Laid-open No. 18711/96 discloses an invention having the object of generalizing the interface portion in which a PC card is combined with a facsimile device. However, for the host device to recognize image input devices using a variety of interfaces as image input devices, a program dedicated to each interface must be incorporated in the host device.

An HDD (Hard Disk Drive) interface is another common example that enables connection with a device not incorporating a control program. However, using this interface in an image input device is not possible because, for example, connection of the image input device with the host device or OS can usually be realized only between devices of the same type, or due to the basic characteristic of an image input device, which is that the read data differ in each instance of use.

SUMMARY OF THE INVENTION

The object of the present invention is to provide an image input device that does not require consideration of the type of OS and hardware configuration of the host device, i.e., that does not require the task of incorporating a dedicated board or a control program dedicated to image input.

In the image input device of the present invention, tuple information, which is information that indicates to the host device the type of device upon connection to the host device, is information that indicates a PC card ATA (AT Attachment) or a memory card and is stored in ROM (Read Only Memory). As a result, the host device recognizes that the connected device is a memory card or a PC card ATA.

While an image reading construct is reading an image as digital data, an image reading circuit deactivates a control signal and makes first and second card detection signals high level, thereby causing the host device to judge that a PC card is not inserted. The image reading circuit then converts the digital data to image data of a file format that can be read by the host device and stores the result to RAM (Random Access Memory). When the image reading construct completes reading of the image, the image reading circuit activates the control signal and makes the first and second card detection signals low level, thereby causing the host device to judge that a PC card is inserted.

Accordingly, the read image data can be transferred to the host device using a program for controlling a PC card that is included in the OS of the host device.

According to another image input device of the present invention, when an interface control circuit is connected to the host device, it causes the host device to recognize the device as a removable device. Then, while the image reading construct is reading an image, the interface control circuit executes a response to the host device indicating that a disk medium is not inserted. The image reading construct, converts the digital data to image data of a file format such as MS-DOS that can be read by the host device. The results are stored the results to RAM. When the image reading construct completes reading of the image, the interface control circuit executes a response to the host device indicating that the disk medium is inserted.

Accordingly, the read image data can be transferred to the host device using a program for controlling a removable device that is included in the OS of the host device.

As described hereinabove, the present invention enables an image input device to fetch the read image data without the necessity for providing a special control program in the host device, and a special control program for fetching image data therefore does not need to be developed or incorporated into the host device.

The above and other objects, features, and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
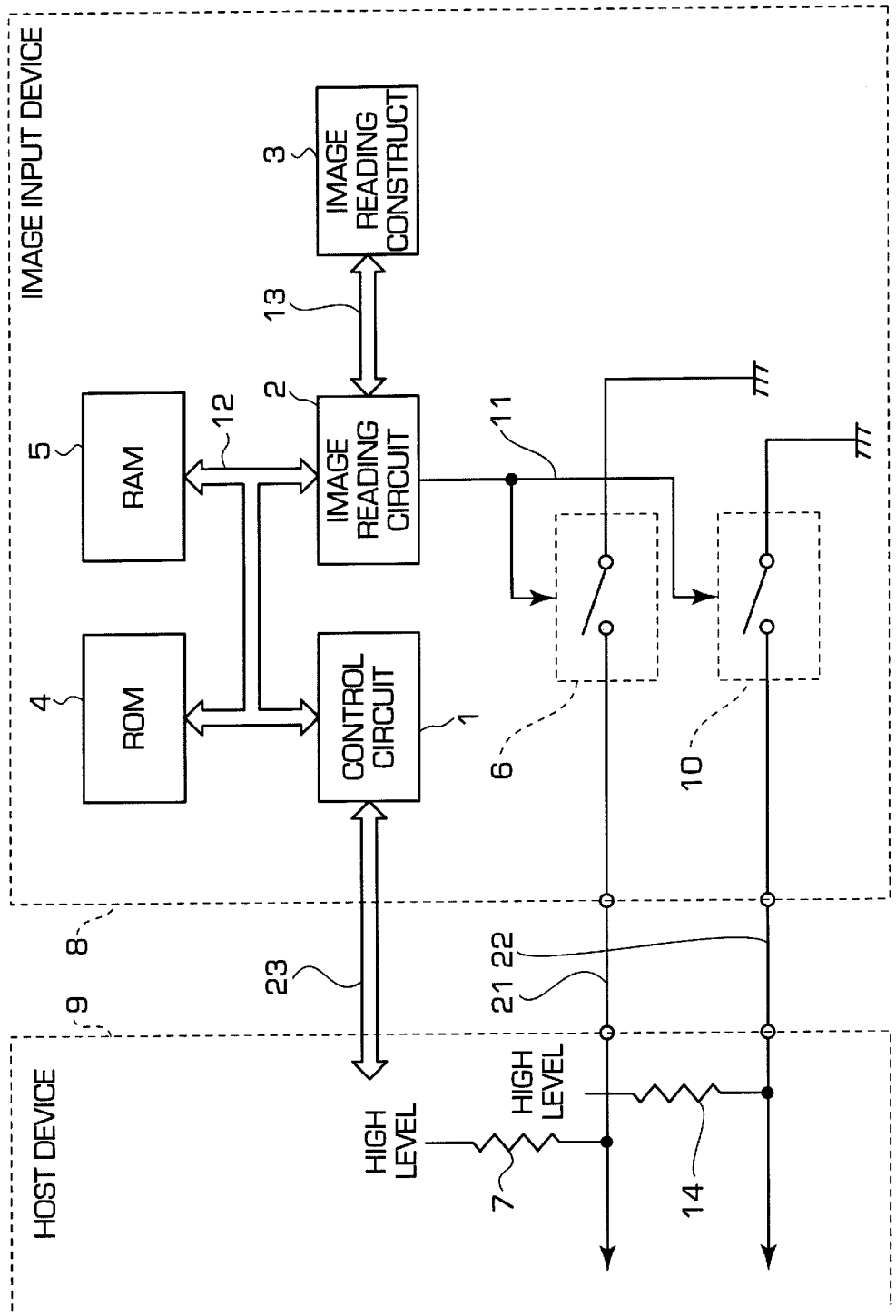
FIG. 1 is a block diagram showing an image input device according to the first embodiment of the present invention.

Referring to FIG. 1, an image input device 8 according to the first embodiment of the present invention employs a PC card/interface in the interface with the host device, and is made up of: ROM 4, image reading construct 3, image reading circuit 2, RAM 5, control circuit 1, switch circuit 6, switch circuit 10, card internal bus 12, and image bus 13.

ROM 4 is connected to card internal bus 12 that transfers data within image input device 8. ROM 4 also stores tuple information, tuple information being information for indicating the type of the image input device to host device 9 to which it is connected. For example, the information stored as tuple information stored in ROM 4 may indicate that the image input device is an ordinary memory card or PC card ATA. The host device 9 reads this tuple information by way of control circuit 1 when the PC card is inserted and thereby recognizes that the connected device is a memory card.

Memory devices that use a PC card/interface are of various types, but the variety of cards referred to as ATA cards or the variety of cards referred to as memory cards as a result of their historical progression have gained wide acceptance on the market, and software for these types of memory cards is therefore supported in the OS of nearly all host devices.

Image reading construct 3 reads the image of a three-dimensional or planar object as digital data and outputs to image bus 13.

Image reading circuit 2 both controls the operation of image reading construct 3 and inputs the digital data read by image reading construct 3 from image bus 13, converts the digital data to image data of a common image file format such as BMP (Bit MaP) format, TIFF (Tag Image File Format) format, or JPEG (Joint Photographic Coding Experts Group) format, and after carrying out any necessary processing such as shading correction or compression, outputs to card internal bus 12 as image data of a widely used file format such as MS-DOS that can be read without the need for a special program by host device 9. In addition, image reading circuit 2 makes control signal 11 a low-level signal during the time interval from the beginning of image reading by image reading construct 3 up to a fixed time interval following the output of image data to card internal bus 12, and makes control signal 11 a high-level signal at all other times.

The format known as MS-DOS format is one of the most common formats for storing data to a memory device, and data stored in accordance with this format can be read by most host devices.

In addition, image data file formats such as BMP format, TIFF format, and JPEG format are widely accepted on the market, and can be used by most application programs for manipulating images.

RAM 5 inputs image data outputted by image reading circuit 2 by way of card internal bus 12 and stores the image data.

In response to a request of card interface signal 23 from host device 9, control circuit 1 reads tuple information stored in ROM 4 and image data stored in RAM 5 and outputs to card interface signal 23.

Switch circuit 6 has one terminal connected to the ground and the other terminal connected to card detection signal 21. When control signal 11 becomes high level, switch circuit 6 connects card detection signal 21 to the ground, thereby making it a low-level signal.

Switch circuit 10 has one terminal connected to the ground and the other terminal connected to card detection signal 22. When control signal 11 becomes high level, switch circuit 10 connects card detection signal 22 to the ground, thereby making it a low-level signal.

Card detection signals 21 and 22 are signals for detecting the presence of PC cards and are internally grounded in normal PC cards. Card detection signal 21 and 22 are connected to high-level voltage within host device 9 by way of pull-up resistors 7 and 14, respectively. Card detection signals 21 and 22 become high-level signals when not connected to the ground, and become low-level signals when connected to the ground. Host device 9 determines that a PC card is inserted when card detection signals 21 and 22 both become low level, and determines that the PC card has been removed when either becomes high level.

The reason for using two card detection signals on the PC card is to judge the insertion or removal of a PC card reliably based on the specifications of the PC card.

Explanation regarding the operation of this embodiment will next be presented with reference to FIG. 1.

First, when image input device 8 is connected to host device 9 using a PC card/interface, host device 9 reads tuple information stored in ROM 4 by way of control circuit 1. At this time, image reading circuit 2 makes control signal 11 a high-level signal, whereby switch circuits 6 and 10 turn ON and card detection signals 21 and 22 become low level. Host device 9 recognizes that the connected PC card is a memory card or a PC card ATA based on card detection signals 21 and 22 and the read tuple information.

When image reading circuit 2 then determines to read a image, image reading circuit 2 makes control signal 11 low level, then switch circuits 6 and 10 are turned OFF, and card detection signals 21 and 22 are made high level, thereby causing host device 9 to judge that the PC card has been removed. Image reading circuit 2 then outputs a read image instruction to image reading construct 3 to bring about reading of the image. In accordance with the instruction from image reading circuit 2, image reading construct 3 then reads the image of an object as digital data and outputs to image bus 13. The digital data outputted to image bus 13 is converted by image reading circuit 2 to image data of a common image file format such as BMP format. TIFF format, or JPEG format, and after the completion of any necessary processing such as shading correction or compression, is stored in RAM 5 in a widely used file format such as MS-DOS. In some cases, this processing may be repeated after the image data are stored in RAM 5.

After the image data have been stored in RAM 5, image reading circuit 2 again makes control signal 11 a high-level signal and turns ON switch circuits 6 and 10, whereby card detection signals 21 and 22 become low level and host device 9 recognizes that a PC card is inserted.

Generally, insertion or removal of a PC card is allowed even when a system is in an operating state, and in memory devices that use a PC card/interface, a difference between the stored contents at the time of insertion and the contents at the time of removal is permitted because the stored contents on a PC card are read out each time PC cards are exchanged. Host device 9, having judged that a PC card has been newly inserted, outputs to card interface signal 23 a command to read the contents of data stored on the inserted PC card.

Image data that at this time have already undergone a succession of processes are stored in RAM 5 in a file format such as MS-DOS that can be read by host device 9.

As a result, the image data stored in RAM 5 are outputted to card interface signal 23 by way of card internal bus 12 and control circuit 1, whereupon the data are read by host device 9 by the same process as when reading data from an ordinary PC card.

A program for controlling a memory card is ordinarily already provided in the OS of host device 9, and host device 9 can therefore fetch image data read by image input device 8 by using this program.

As switch circuits 6 and 10, transistors may also be used having bases connected to control signal 11 by way of resistors, emitters connected to the ground, and collectors connected to card detection signals 21 and 22.

Alternatively, relays may be used for switch circuits 6 and 10.

Second Embodiment

The second embodiment of the image input device according to the present invention will next be described with reference to FIGS. 2 and 3.

Although the first embodiment described hereinabove was an example using a PC card/interface at the interface of the image input device and the host device, the image input device of this embodiment is an example that uses a widely used interface such as a SCSI or an ATAPI (AT Attachment Packet Interface).

Figure 2:
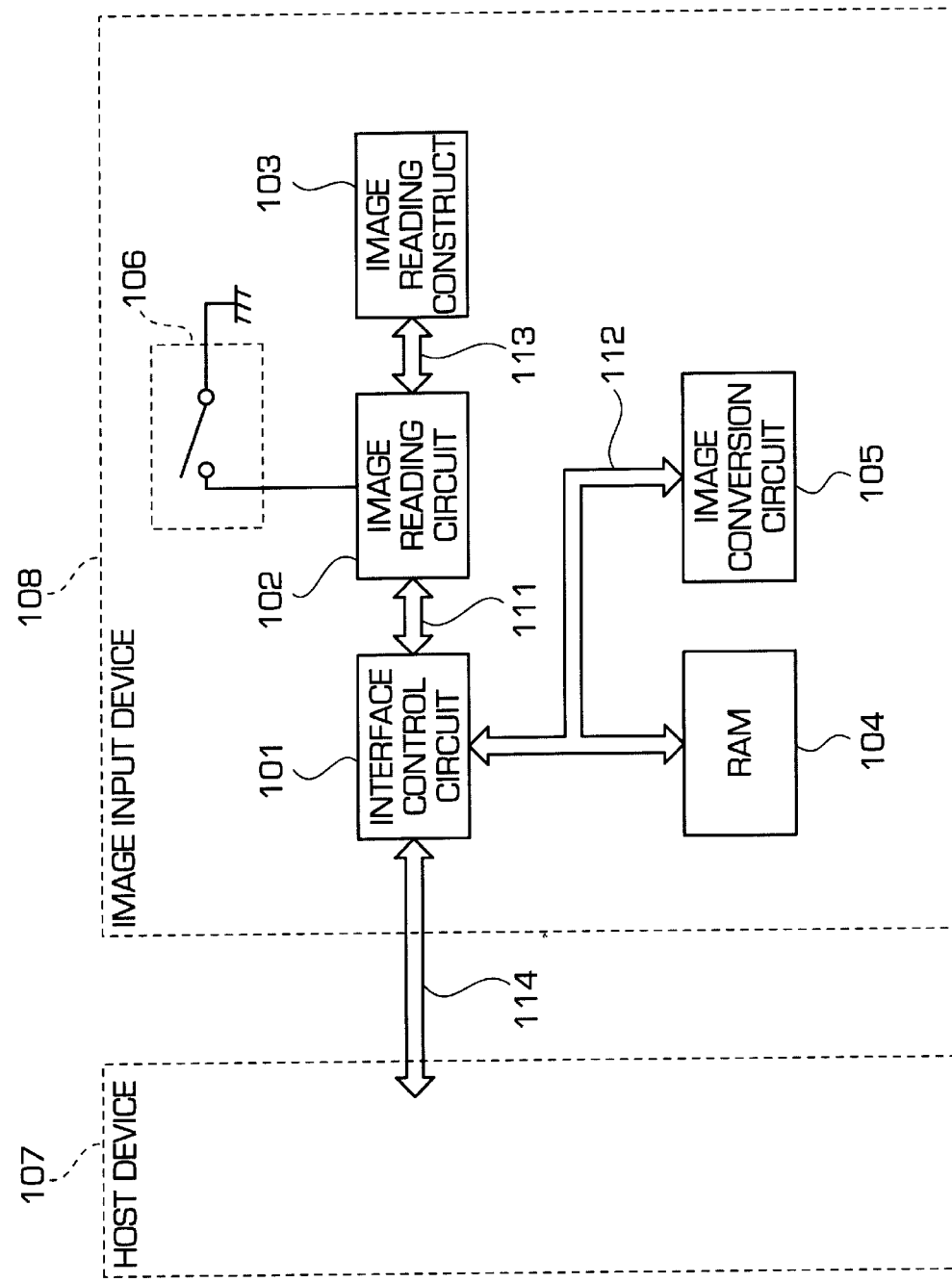
FIG. 2 is a block diagram showing an image input device according to the second embodiment of the present invention.

As shown in FIG. 2, image input device 108 of this embodiment is made up of: image reading construct 103, image reading circuit 102, image input start switch 106, interface control circuit 101, image conversion circuit 105. RAM 104, data bus 111, image bus 113, and device internal bus 112.

In addition, image input device 108 is connected to host device 107 by means of interface bus 114. An interface such as a SCSI or ATAPI is used in this interface bus 114, and this interface is used for the transfer of information regarding the connected apparatus or for transmitting data from image input device 108.

Image reading construct 103 reads the image of a three-dimensional or planar object as digital data and outputs to image bus 113.

Image input start switch 106 has one side connected to the ground and the other side connected to image reading circuit 102, and when pressed, transmits a command to image reading circuit 102 to start an image reading operation.

When image input start switch 106 enters a closed state, image reading circuit 102 controls image reading construct 103 to instruct the reading of an image, and inputs digital data read by image reading construct 103 from image bus 113 and outputs to data bus 111.

Interface control circuit 101 is connected to host device 107 by means of interface bus 114, to image reading circuit 102 by way of data bus 111, and to image conversion circuit 105 and RAM 104 by way of device internal bus 112. Upon being connected to host device 107, interface control circuit 101 executes a response to host device 107 by way of interface bus 114 indicating that image input device 108 is a removable device.

While image reading construct 103 is reading an image, interface control circuit 101 executes a response to host device 107 indicating that the disk medium is in a non-inserted state, and when image reading construct 103 has completed reading the image, executes a response to host device 107 indicating that the disk medium is in an inserted state. Interface control circuit 101 outputs image data inputted from image reading circuit 102 by way of data bus 111 to image conversion circuit 105 by way of device internal bus 112. Further, when an image data transfer request is inputted from host device 107 by way of interface bus 114, interface control circuit 101 brings about output of image data stored in RAM 104 and then outputs this image data to interface bus 114.

After reading and transmitting one item of image data to host device 107, interface control circuit 101 determines based on instructions from host device 107 whether to erase image data stored in RAM 104 and fetch the next image data or to append the next image data to the currently read image data and store. In cases in which image data currently stored in RAM 104 are no longer needed, interface control circuit 101 erases that image data.

The term "removable device" indicates a storage device that allows exchange of a disk medium such as an MO (magneto-optical disk).

Host device 107 does not output an image data transfer request in the case of a response indicating that the disk medium is in a non-inserted state, and puts output of the transfer request on standby until there is a response indicating that the disk medium is in an inserted state.

Image conversion circuit 105 converts image data inputted by way of device internal bus 112 to a common BMP format or to a compressed JPEG or TIFF format that can be read by host device 107 and converts to a widely used file format such as MS-DOS that host device 107 can read without need for a special control program, and outputs the result to RAM 104 by way of device internal bus 112.

In accordance with the instructions of interface control circuit 101, RAM 104 stores image data outputted from image conversion circuit 105, outputs stored image data to device internal bus 112, and erases stored image data.

Explanation will next be presented regarding the operation of the image input device of this embodiment.

When image input device 108 is connected to host device 107, interface control circuit 101 executes a response to host device 107 by way of interface bus 114 indicating that it is a removable device. In addition, simultaneously with the introduction of power, this interface control circuit 101 responds to host device 107 that it is in an initial state, i.e., a state in which the disk medium is not inserted and no data exists on the disk medium. As a result, host device 107 recognizes that device connected by interface bus 114 as a removable device.

Figure 3:
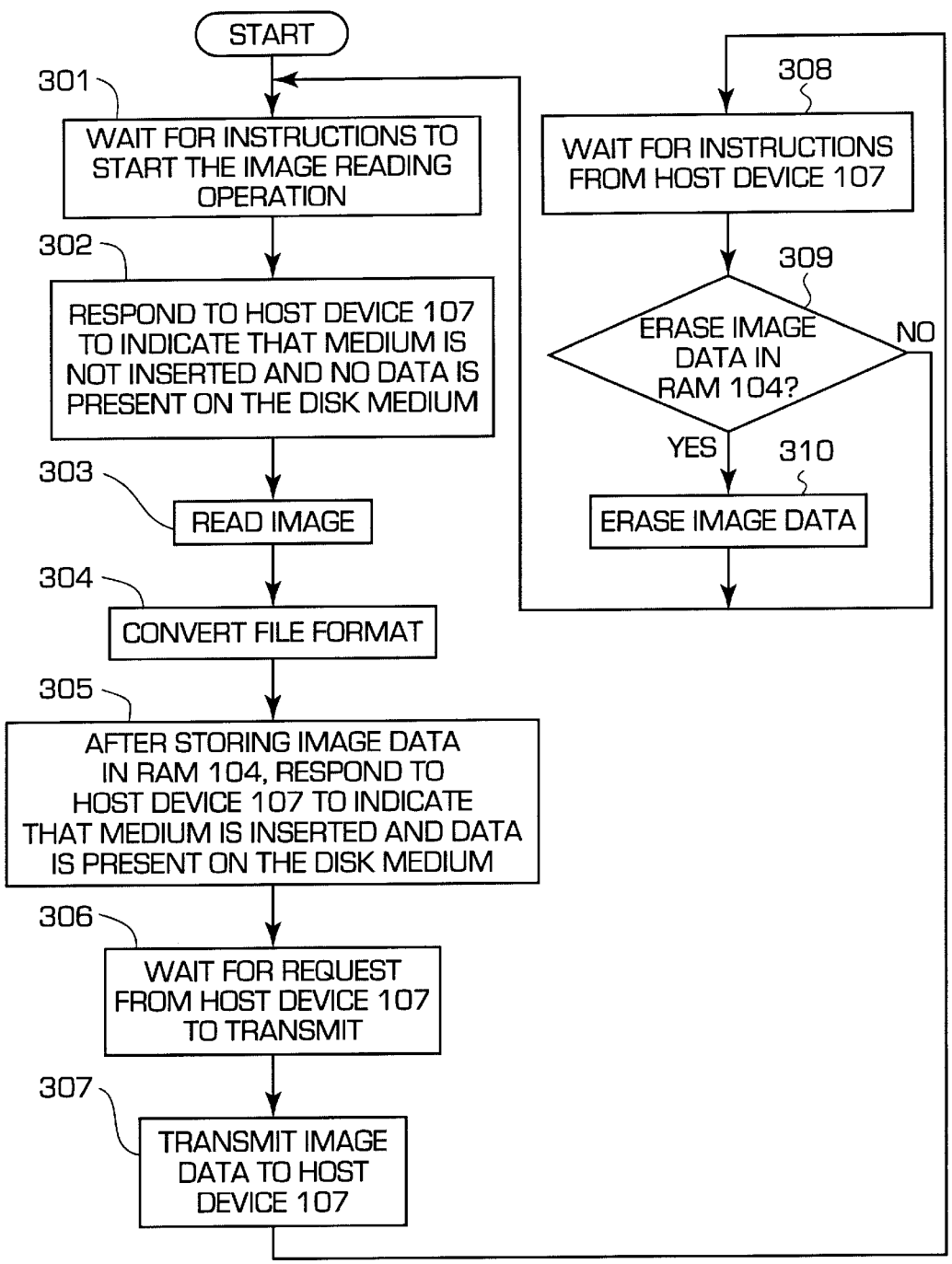
FIG. 3 is a flow chart illustrating the image reading operation of the image input device of FIG. 2.

Explanation will next be presented regarding the image reading operation of the image input device 108 shown in FIG. 2 with reference to the flow chart of FIG. 3. First, after setting the object to be read in image reading construct 103, the image reading operation start command is inputted to image reading circuit 102 by pressing image input start switch 106, whereby instructions to carry out the reading operation are outputted from image reading circuit 102 to image reading construct 103 (Step 301). Interface control circuit 101 then transmits a response to host device 107 by way of interface bus 114 indicating that the disk medium is not inserted and that no data exist on the disk medium (Step 302). Image reading construct 103 next reads the image as digital data and outputs the read digital data as image data to image bus 113 (Step 303). The read image data is inputted to image conversion circuit 105 by way of device internal bus 112, where, after once being converted to BMP format or compressed JPEG or TIFF format, the data are finally converted to a file format such as MS-DOS (Step 304).

The image data that have been converted to a file format such as MS-DOS are then stored in RAM 104. At this time, interface control circuit 101 carries out a response to host device 107 indicating that the disk medium is inserted and that a file is written to the disk medium (Step 305).

Next, upon input of an image data transmission request from host device 107 by way of interface bus 114 (Step 306), interface control circuit 101 operates in the same manner as a removable device, and image data stored in RAM 104 are transmitted to host device 107 by way of device internal bus 112, interface control circuit 101, and interface bus 114 (Step 307).

Interface control circuit 101 then waits for instructions from host device 107 as to whether to erase the image data stored in RAM 104 (Step 308). If instructions comes indicating that image data stored in RAM 104 are to be erased, interface control circuit 101 erases the image data (Step 310), and if instructions come indicating that image data are to be retained, interface control circuit 101 returns to the state of Step 301.

By subsequently repeating the above-described operations., read image data can be transmitted to host device 107.

The use of the image input device of this embodiment obviates the need for a special control program for reading image data because a program for controlling a removable device is generally provided in the host device.

While preferred embodiments of the present invention have been described using specific terms, such description is for illustrative purposes only, and it is to be understood that changes and variations may be made without departing from the spirit or scope of the following claims.

What is claimed is:

1. An image input device comprising:

a ROM connected to a card internal bus for transferring data, and that stores, as information indicating a memory card or a PC card ATA, tuple information which is information that indicates to a host device the type of said image input device when said image input device is connected to said host device;

an image reading construct for reading an image of an object as digital data and outputting to an image bus for transmitting image data;

an image reading means for controlling the operation of said image reading construct, and for inputting digital data read by said image reading construct from said image bus and outputs said digital data to said card internal bus as image data of a file format that can be read by said host device without requiring dedicated control programming for said image input device, wherein said image reading means deactivates a control signal during a time interval from the start of image reading by said image reading construct until the passage of a fixed time interval following output of said image data to said card internal bus, and wherein said image reading means activates said control signal for times other than said time interval;

a RAM for inputting image data outputted by said imagereading means from said card internal bus and stores said image data;

control means, in accordance with a request of a card interface signal which is a signal from said host device, reads tuple information stored in said ROM and image data stored in said RAM, and outputs said tuple information and said image data;

first switch means has one terminal connected to a ground potential and another terminal connected to receive a first card detection signal for detecting the presence of a PC card, wherein said first switch means connects said other terminal to the ground potential when said control signal becomes active, thereby making said first card detection signal a low-level signal; and second switch means has one terminal connected to the ground potential and another terminal connected to receive a second card detection signal for detecting the presence of a PC card, wherein said second switch means connects said other terminal of said second switch means to the ground potential when said control signal becomes active, thereby making said second card detection signal a low level signal.

2. An image input device according to claim 1 wherein:

said first switch means is a transistor having a base connected to said control signal by way of resistance, an emitter connected to the ground potential, and a collector connected to receive said first card detection signal; and said second switch means is a transistor having a base connected to said control signal by way of a resistance, an emitter connected to the ground potential, and a collector connected to receive said second card detection signal.

3. An image input device according to claim 1 wherein said first switch means and said second switch means are relays.

* * * * *